(12) United States Patent
Pudleiner et al.

(10) Patent No.: US 9,827,806 B2
(45) Date of Patent: Nov. 28, 2017

(54) DATA SHEET FOR A SECURITY AND/OR VALUE DOCUMENT

(71) Applicants: BUNDESDRUCKEREI GMBH, Berlin (DE); Covestro Deutschland AG (Bayer Material Science AG), Leverkusen (DE)

(72) Inventors: Heinz Pudleiner, Krefeld (DE); Georgios Tziovaras, Wuppertal (DE); Cengiz Yesildag, Leverkusen (DE); Stefan Trölenberg, Mittenwald (DE); Jörg Fischer, Berlin (DE); Franziska Peinze, Berlin (DE)

(73) Assignees: BUNDESDRUCKEREI GMBH (DE); COVESTRO DEUTSCHLAND AG (DE)

( * ) Notice: Subject to any disclaimer, the term of this patent is extended or adjusted under 35 U.S.C. 154(b) by 0 days.

(21) Appl. No.: 15/230,971

(22) Filed: Aug. 8, 2016

(65) Prior Publication Data

US 2016/0355044 A1    Dec. 8, 2016

Related U.S. Application Data

(63) Continuation of application No. 14/761,381, filed as application No. PCT/DE2013/000677 on Nov. 13, 2013, now abandoned.

(30) Foreign Application Priority Data

Jan. 17, 2013    (DE) .................. 10 2013 000 717

(51) Int. Cl.
*G06K 19/02*    (2006.01)
*B42D 25/387*    (2014.01)
(Continued)

(52) U.S. Cl.
CPC ............ *B42D 25/387* (2014.10); *B32B 5/024* (2013.01); *B32B 5/18* (2013.01); *B32B 27/12* (2013.01);
(Continued)

(58) Field of Classification Search
USPC .................. 235/375, 380, 451, 488, 492
See application file for complete search history.

(56) References Cited

U.S. PATENT DOCUMENTS 2,970,131 A    1/1961    Moyer
2,991,273 A    7/1961    Hechellhammer
(Continued)

FOREIGN PATENT DOCUMENTS

DE    1570703    2/1970
DE    2211956    3/1972
(Continued)

OTHER PUBLICATIONS

H. Schnell, Chemistry and Physics of Polycarbonates, Interscience Publishers, New York 1964.
(Continued)

*Primary Examiner* — Tuyen K Vo
(74) *Attorney, Agent, or Firm* — Mayer & Williams PC

(57) ABSTRACT

The invention relates to a datasheet (1) for integrating into a preferably book-like security and/or value document. The datasheet (1) is made of at least two stacked layers (2, 3) made of an organic polymer material. A textile (5) is arranged at least in a sub-region between the layers (2, 3) and outside of the layers (2, 3) so as to form a tab (4), and the textile (5) is at least partly coated on one or both sides and/or saturated with an organic binder (6) at least in the region between the layers (2, 3) and is bonded to the two layers (2, 3) by means of the binder (6).

9 Claims, 2 Drawing Sheets

(51) Int. Cl.
*G06K 19/077* (2006.01)
*B32B 5/18* (2006.01)
*B32B 37/14* (2006.01)
*B42D 25/465* (2014.01)
*B42D 25/29* (2014.01)
*B42D 25/00* (2014.01)
*B42D 25/47* (2014.01)
*B42D 25/24* (2014.01)
*C09D 11/03* (2014.01)
*B32B 5/02* (2006.01)
*B32B 27/12* (2006.01)
*B32B 27/30* (2006.01)
*B32B 27/32* (2006.01)
*B32B 27/36* (2006.01)
*B32B 27/40* (2006.01)
*B42D 25/333* (2014.01)
*B42D 25/342* (2014.01)
*C08G 64/42* (2006.01)
*C09D 5/22* (2006.01)
*C09D 11/102* (2014.01)

(52) U.S. Cl.
CPC ............ *B32B 27/30* (2013.01); *B32B 27/308* (2013.01); *B32B 27/32* (2013.01); *B32B 27/365* (2013.01); *B32B 27/40* (2013.01); *B32B 37/14* (2013.01); *B42D 25/00* (2014.10); *B42D 25/24* (2014.10); *B42D 25/29* (2014.10); *B42D 25/333* (2014.10); *B42D 25/342* (2014.10); *B42D 25/465* (2014.10); *B42D 25/47* (2014.10); *C08G 64/42* (2013.01); *C09D 5/22* (2013.01); *C09D 11/03* (2013.01); *C09D 11/102* (2013.01); *G06K 19/027* (2013.01); *G06K 19/07722* (2013.01); *G06K 19/07749* (2013.01); *G06K 19/07758* (2013.01); *B32B 2260/021* (2013.01); *B32B 2260/046* (2013.01); *B32B 2262/0261* (2013.01); *B32B 2262/0276* (2013.01); *B32B 2262/101* (2013.01); *B32B 2270/00* (2013.01); *B32B 2305/72* (2013.01); *B32B 2307/4026* (2013.01); *B32B 2307/41* (2013.01); *B32B 2307/412* (2013.01); *B42D 2033/20* (2013.01); *B42D 2033/30* (2013.01); *B42D 2033/32* (2013.01); *B42D 2033/46* (2013.01); *Y10T 428/2476* (2015.01)

(56) References Cited

U.S. PATENT DOCUMENTS

| | | |
|---|---|---|
| 2,999,835 A | 9/1961 | Schnell |
| 2,999,846 A | 9/1961 | Schnell |
| 3,028,365 A | 4/1962 | Schnell |
| 3,062,781 A | 11/1962 | Bottenbruch |
| 3,148,172 A | 9/1964 | Fox |
| 3,271,367 A | 9/1966 | Schnell |
| 3,275,601 A | 9/1966 | Schnell |
| 3,737,409 A | 6/1973 | Fox |
| 3,879,348 A | 4/1975 | Serini |
| 4,671,839 A * | 6/1987 | Finkel ............... B32B 38/06 156/257 |
| 5,227,458 A | 7/1993 | Freitag et al. |
| 5,648,414 A | 7/1997 | Bier et al. |
| 5,766,812 A * | 6/1998 | Malhotra ............ B41M 3/00 156/277 |
| 6,213,702 B1 | 4/2001 | Wesselink |
| 6,589,622 B1 | 7/2003 | Scott |
| 7,758,079 B2 | 7/2010 | Beyer-Meklenburg et al. |
| 8,336,915 B2 | 12/2012 | Christen et al. |
| 2002/0172807 A1 | 11/2002 | Ridyard et al. |
| 2004/0069853 A1* | 4/2004 | Aharonson ........ G06K 19/0728 235/454 |
| 2005/0180020 A1* | 8/2005 | Steenblik ............ B42D 25/29 359/626 |
| 2007/0058260 A1* | 3/2007 | Steenblik ............ B42D 25/29 359/626 |
| 2008/0020189 A1 | 1/2008 | Hofmair et al. |
| 2009/0321531 A1 | 12/2009 | Speich |
| 2010/0021657 A1* | 1/2010 | Lochtman .............. H05K 3/046 427/597 |
| 2010/0301595 A1* | 12/2010 | Muth .................. C09D 11/36 283/72 |
| 2010/0304093 A1* | 12/2010 | Hagemann ............ B41M 3/14 428/172 |
| 2011/0010125 A1 | 1/2011 | Zafiris |
| 2012/0319394 A1 | 12/2012 | Christen et al. |

FOREIGN PATENT DOCUMENTS

| | | |
|---|---|---|
| DE | 2063050 | 7/1972 |
| DE | 2063052 | 7/1972 |
| DE | 3832396.6 | 2/1990 |
| DE | 4421561 A1 | 12/1995 |
| DE | 102004055495 A1 | 5/2006 |
| DE | 102008012428 B3 | 7/2009 |
| EP | 0013021 A1 | 7/1980 |
| EP | 0688839 | 12/1995 |
| EP | 2116390 | 11/2009 |
| EP | 1812244 | 1/2010 |
| FR | 1561518 | 3/1968 |
| GB | 1122003 | 7/1968 |
| GB | 1367790 | 9/1974 |
| WO | 2006079224 | 8/2006 |

OTHER PUBLICATIONS

H. Schnell "Chemistry and Physics of Polycarbonates", Polymer Reviews, vol. IX, p. 33ff., Interscience Publ. 1964.

* cited by examiner

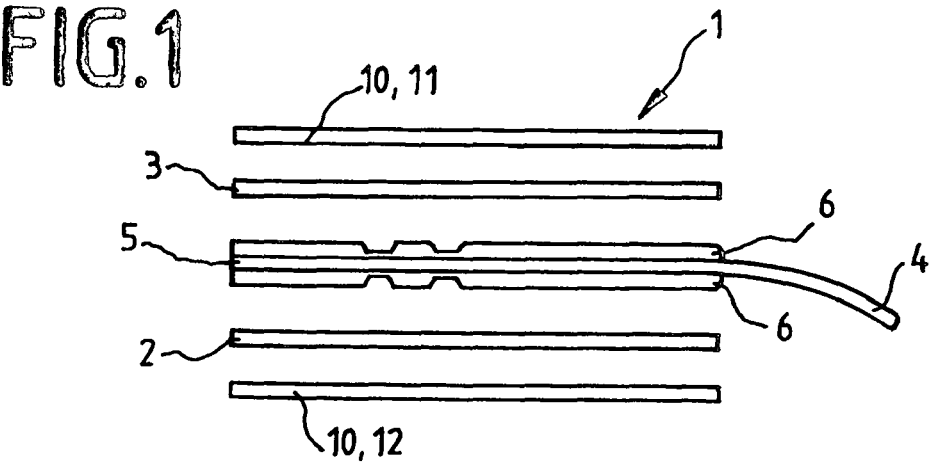
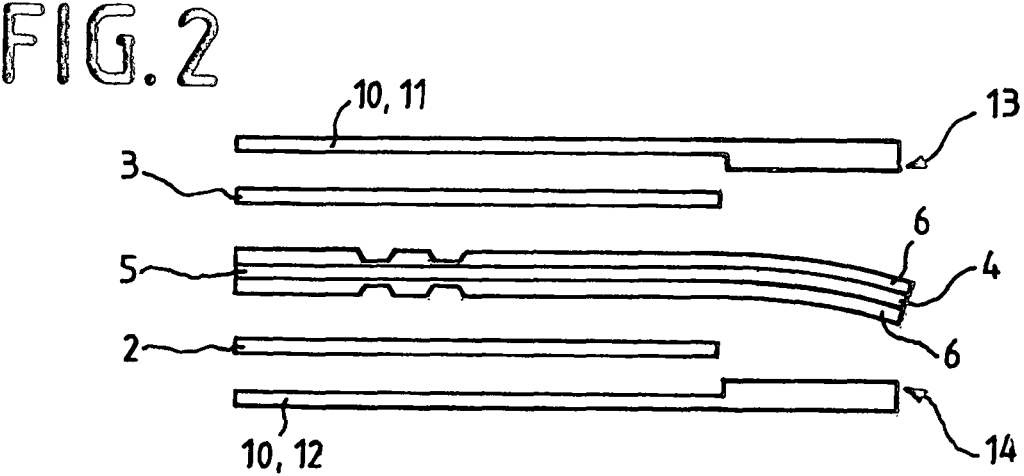
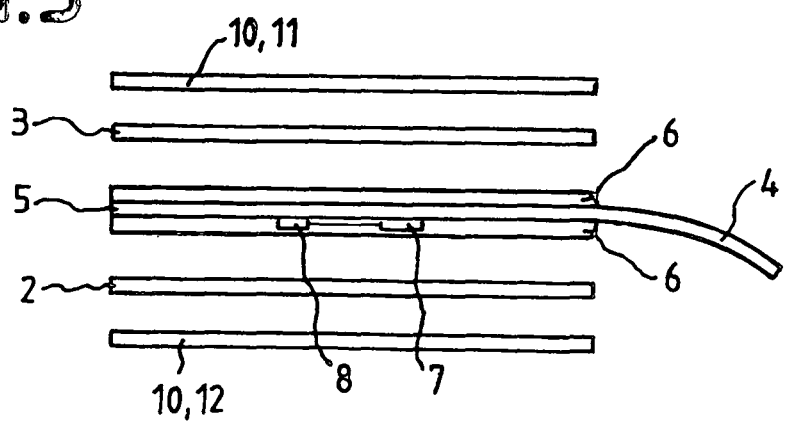

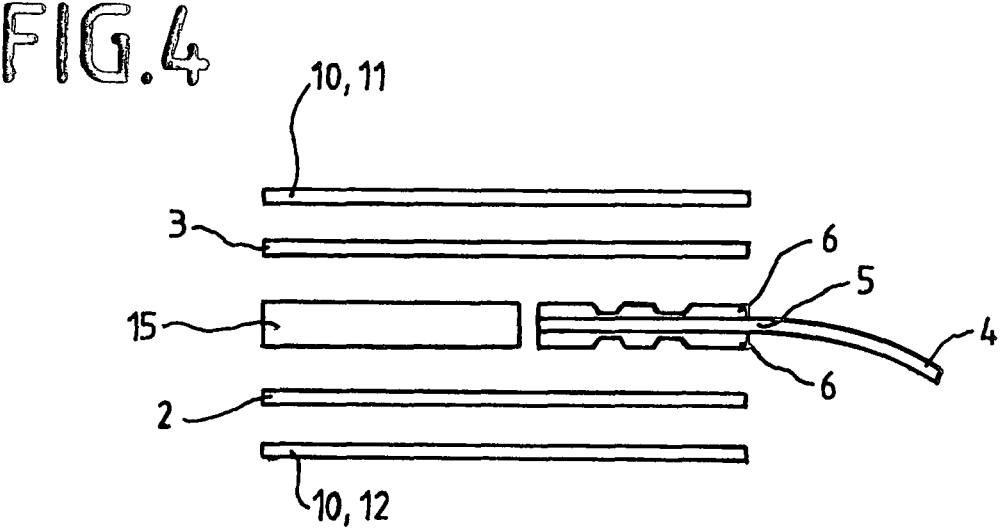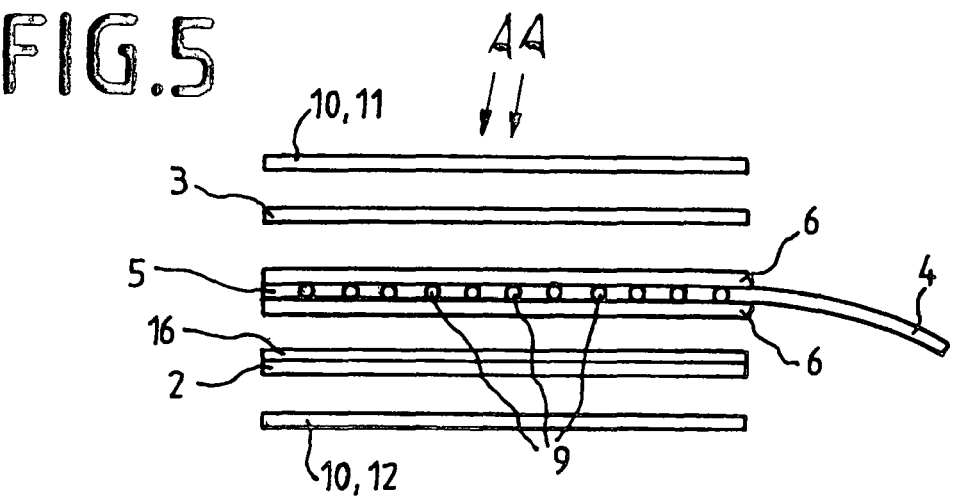

DATA SHEET FOR A SECURITY AND/OR VALUE DOCUMENT

FIELD OF THE INVENTION

The invention relates to a data sheet for integration in a preferably book-like security and/or valuable document, the data sheet being formed of at least two stacked layers of an organic polymeric material, and at least in a partial section a textile being disposed between the layers and outside the layers, forming a flap. The invention further relates to a method for preparing such a data sheet and to a security and/or valuable document comprising such a data sheet.

BACKGROUND OF THE INVENTION AND PRIOR ART

Data sheets according to the invention are typically contained in book-like documents. In the meaning of the invention, the term "book format" also comprises booklets, and the number of pages or sheets may be in the range from 1 to 50, typically from 5 to 40. These documents may contain only one data sheet according to the invention or a plurality of such data sheets, which usually (but not necessarily) are disposed between two book covers (hard or flexible). Together with the data sheet, further data sheets being different therefrom, for instance based on paper materials, may be included. Such a document is for instance a passport, but any other documents having this structure are included.

Such data sheets typically carry information, at least partially individualized and/or personalized. Individualized means referred to a document, e.g., a serial number. Personalized means referred to the document owner, e.g., name or picture. Furthermore, in such a data sheet, security features may be integrated. For this purpose, all conventional security features are contemplated, which can typically be employed as data sheets with plastic laminates.

Such a book-like document using a textile fabric as a flap or hinge is known from the document WO2006/079224. A booklet-like document having a textile core layer, but with an expensive thermoplastic plastic layer is known from the document EP 1812244. A passport having a plasticized data page and using a fleece strip as kinking/bending edge is known from the document EP 2116390.

For instance from the document EP 0688839 A2 are per se known, in a different context, polycarbonates based on a geminally disubstituted dihydroxy-diphenyl cycloalkane. In this prior art, such polycarbonates are employed as binding agents for screen printing materials. In this document, further, methods for preparing such polycarbonates are disclosed. Such polycarbonates are now also used in the field of security and/or valuable documents, in which context reference is made, e.g., to the document having the PCT filing number PCT/DE 2007/001751.

Disadvantageous, in the insofar known security and/or valuable documents, is an insufficient flexibility of the flap of the data sheet, which causes a "folding-open" situation of the book. Furthermore, there exists, e.g., for TPU flaps, a potential risk of delamination of the passport card between TPU inner layer and PC outer layers that can be reduced by additional efforts, for instance coatings or material modifications. For fabric flap concepts for preparing security and/or valuable documents, typically a fabric material that is not employed in passport or data sheets, e.g., polyester, is used. In order to obtain a firm connection of flap material and polymeric layers of the data sheet, expensive cut-outs have to be formed, such as for instance described in the document WO 2006079224.

Technical Object of the Invention

It is therefore the technical object of the invention to specify a data sheet, which, on the one hand, includes a flap with high flexibility and thus safely prevents a "folding-open" situation of the document, and on the other hand, ensures a safe mutual connection of all components of the data sheet, including the flap, together with simple producibility.

Basics of the Invention and Preferred Embodiments

For achieving this technical object, the invention teaches a data sheet for integration in a preferably book- or booklet-type security and/or valuable document, the data sheet being formed of at least two stacked layers of an organic polymeric material, at least in a partial section between the layers and outside the layers, a textile forming a flap being disposed, and the textile being coated and/or wet through on one or both sides at least in the region between the layers at least partially with an organic binding agent and being bonded with the two layers by means of the binding agent.

By a data sheet according to the invention, a highly flexible flap is ensured, which in the completed document serves as a hinge flap and which is further particularly safely connected with the layers of the data sheet. A data sheet according to the invention can further be produced in a comparatively simple way.

In principle, the organic polymer of the layers may be any polymeric material used in the field of the security and/or valuable documents. Examples for this include: transparent, opaque, or intransparent polymeric materials. The organic polymeric material of the layers may for instance be selected from the group consisting of PC (polycarbonate, in particular bisphenol A polycarbonate), PET (polyethylene terephthalate), PMMA (poly(methyl methacrylate)), TPU (thermoplastic polyurethane elastomers), PE (polyethylene), PP (polypropylene), PI (polyimide or poly-trans-isoprene), PVC (polyvinyl chloride), polystyrene, polyacrylates and methacrylates, vinyl esters, ABS, and copolymers of such polymers. Particularly preferred is the use of PC for the layers.

The plastic materials for the plastic films may include all transparent thermoplastic materials: polyacrylates, polymethacrylates (PMMA; Plexiglas® company Röhm), cycloolefin copolymers (COC; Topas® company Ticona; Zenoex® company Nippon Zeon; Apel® company Japan Synthetic Rubber), polysulfones (Ultrason® company BASF; Udel® company Solvay), polyesters, such as, e.g., PET or PEN, polycarbonate, polycarbonate/polyester-blends, e.g., PC/CoPET, polycarbonate/polycyclohexyl methanol cyclohexane dicarboxylate (PCCD; Solix® company Sabic Innovative Plastics), polycarbonate/PBT (Xylex®).

Preferably, in the context of the invention, the thermoplastic material(s) in the layers is (are) independently from each other polycarbonates or copolycarbonates based on diphenols, poly- or copolyacrylates, poly- or copolymethacrylates, poly- or copolymers with styrene, thermoplastic polyurethane, polyolefins, poly- or copolycondensates of the terephthalic acid or naphthalene dicarboxylic acid or mixtures thereof, preferably polycarbonates or copolycarbonates based on diphenols, poly- or copolyacrylates, poly- or copolymethacrylates, poly- or copolycondensates of the terephthalic acid or naphthalene dicarboxylic acid or mixtures thereof.

Basically, the organic binding agent may be any binding agent, which firmly and stably binds to the organic polymer of the layers, in particular during lamination. Preferred is as the binding agent, in particular when using PC as a material for the layers, a polycarbonate derivative, in particular based on bisphenol A, preferably based on a geminally disubstituted dihydroxy-diphenyl cycloalkane. In detail, the binding agent preferably configured as a polycarbonate derivative may contain functional carbonate structure units of Formula (I),

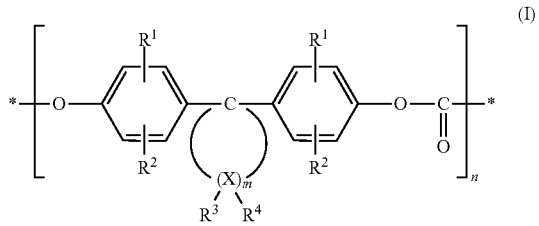

wherein $R^1$ and $R^2$ are independently from each other hydrogen, halogen, preferred chlorine or bromine, $C_1$-$C_8$ alkyl, $C_5$-$C_6$ cycloalkyl, $C_6$-$C_{10}$ aryl, preferred phenyl, and $C_7$-$C_{12}$ aralkyl, preferred phenyl-$C_1$-$C_4$ alkyl, in particular benzyl; m is an integer from 4 to 7, preferred 4 or 5; $R^3$ and $R^4$ are individually selectable for every X, independently from each other hydrogen or $C_1$-$C_6$ alkyl; X is carbon and n is an integer greater than 20, with the proviso that at least at one atom X, $R^3$ and $R^4$ are simultaneously alkyl.

It is further preferred that at 1 to 2 atoms X, in particular only at one atom X, $R^3$ and $R^4$ are simultaneously alkyl are. $R^3$ and $R^4$ may in particular be methyl. The X atoms in the alpha-position to the diphenyl-substituted C atom (C1) can be not-substituted with dialkyl. The X20 atoms in the beta-position to C1 can be disubstituted with alkyl. Preferred is m=4 or 5. The polycarbonate derivative can for instance be formed on the basis of monomers, such as 4,4'-(3,3,5-trimethyl cyclohexane-1,1-diyl)diphenol, 4,4'-(3,3-dimethyl cyclohexane-1,1-diyl)diphenol, or 4,4'-(2,4,4-trimethyl cyclopentane-1,1-diyl)diphenol.

A binding agent according to the invention can for instance be made according to the document DE 38 32 396.6 from diphenols of Formula (Ia), the content of disclosure of which is hereby included to full extent in the content of disclosure of this description.

A diphenol of Formula (Ia) to form homopolycarbonates as well as a plurality of diphenols of Formula (Ia) to form copolycarbonates can be used (same meaning of radicals, groups, and parameters as in Formula I).

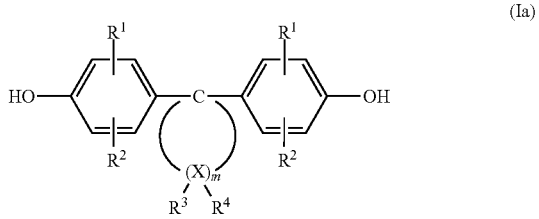

Furthermore, the diphenols of Formula (Ia) can also be used in a mixture with other diphenols, for instance with those of Formula (Ib)

$$HO-Z-OH \quad (Ib),$$

for preparing high-molecular, thermoplastic, aromatic polycarbonate derivatives.

Suitable other diphenols of Formula (Ib) are those, in which Z is an aromatic radical with 6 to 30 C atoms that may contain one or a plurality of aromatic nuclei, may be substituted, and may contain aliphatic radicals or other cycloaliphatic radicals than those of Formula (Ia), or heteroatoms as bridge elements.

Examples for the diphenols of Formula (Ib) are: hydrochinon, resorcin, dihydroxydiphenyle, bi-(hydroxyphenyl)-alkane, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, alpha,alpha'-bis-(hydroxyphenyl)-diisopropylbenzenes and the nucleus-alkylated and nucleus-halogenated compositions.

These and further suitable diphenols are described, e.g., in the documents U.S. Pat. Nos. 3,028,365, 2,999,835, 3,148,172, 3,275,601, 2,991,273, 3,271,367, 3,062,781, 2,970,131, and 2,999,846, in the documents DE-A 1,570,703, 2,063,050, 2,063,052, 2,211,956, the FR-A 1,561,518 and in the monography "H. Schnell, Chemistry and Physics of Polycarbonates, Interscience Publishers, New York 1964", the contents of disclosure of which are hereby included to full extent in the content of disclosure of this application.

Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha,alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, alpha,alpha-bis-(3,5-dimethyl-4-hydroxyphenyl)-p-diisopropylbenzene, 2,2-bis-(3,5-dichloro-4-hydroxyphenyl)-propane, and 2,2-bis-(3,5-dibromo-4-hydroxyphenyl)-propane.

Particularly preferred diphenols of Formula (Ib) are for instance: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane. Particularly preferred is 2,2-bis-(4-hydroxyphenyl)-propane. The other diphenols can be used either individually or in a mixture.

The molar ratio of diphenols of Formula (Ia) relative to the other diphenols of Formula (Ib) to be also used, if applicable, is to be between 100 mole % (Ia) to 0 mole % (Ib) and 2 mole % (Ia) to 98 mole % (Ib), preferably between 100 mole % (Ia) to 0 mole % (Ib) and 10 mole % (Ia) to 90 mole % (Ib) and in particular between 100 mole % (Ia) to 0 mole % (Ib) and 30 mole % (Ia) to 70 mole % (Ib) and most particularly between 100 mole % (Ia) to 0 mole % (Ib) and 50 mole % (Ia) to 50 mole % (Ib).

The high-molecular polycarbonates from the diphenols of Formula (Ia), if applicable in combination with other diphenols, can be produced by the known polycarbonate production methods. The various diphenols may be linked statistically as well as block-wise to each other.

The polycarbonate derivatives used according to the invention may be branched in a per se known manner. When branching is desired, this can be obtained in a known manner by condensating small amounts, preferably amounts between 0.05 and 2.0 mole % (referred to employed diphenols), at three- or more than three-functional compositions, in particular such with three or more than three phenolic hydroxyl groups. Some branching agents with three or more than three phenolic hydroxyl groups are: phloroglucin, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-ortho-terephthalic acid ester, tetra-(4-hydroxyphenyl)-methane, tetra-[4-(4-hydroxyphenyl-isopropyl)phenoxy]-methane, and 1,4-bis-[4',4"-dihydroxytriphenyl)-methyl]-benzene. Some of the other three-functional compositions are 2,4-dihydroxybenzoic acid, trimesic acid, cyanuric chloride, and 3,3-bis-(3-methyl-4-hydroxyphenyl)-2-oxo-2,3-dihydroindol.

As chain terminators for regulating the molecular weight of the polycarbonate derivatives, which is per se known, can be used monofunctional compositions in usual concentrates. Suitable compositions are, e.g., phenol, tert.-butylphenol or other alkyl-substituted phenols. For regulating the molecular weight, in particular small amounts of phenols of Formula (Ic) suitable.

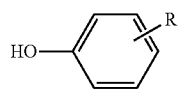

(Ic)

wherein R is a branched $C_8$ and/or $C_9$ alkyl radical.

Preferred in the alkyl radical R is an amount of $CH_3$ protons between 47 and 89% and an amount of the CH and $CH_2$ protons between 53 and 11%; further is preferred R in o- and/or p-position to the OH group, and particularly preferred an upper limit of the ortho portion of 20%. The chain terminators are in general used in amounts from 0.5 to 10, preferred 1.5 to 8 mole %, referred to the employed diphenols.

Preferably, the polycarbonate derivatives can be produced according to the phase boundary method (cf. H. Schnell "Chemistry and Physics of Polycarbonates", Polymer Reviews, Vol. IX, page 33ff., Interscience Publ. 1964) in a per se known manner.

Herein, the diphenols of Formula (Ia) are dissolved in an aqueous alkaline phase. For producing copolycarbonates with other diphenols, mixtures of diphenols of Formula (Ia) and the other diphenols, for instance those of Formula (Ib), are employed. For regulating the molecular weight, chain terminators, e.g., those of Formula (Ic), can be added. Then, in presence of an inert, preferably polycarbonate-dissolving organic phase the reaction is performed with phosgene using the interfacial condensation method. The reaction temperature is between 0° C. and 40° C.

The branching agents being also employed, if applicable (preferred 0.05 to 2.0 mole %) may either be provided with the diphenols in the aqueous alkaline phase or added dissolved in the organic solvent before the phosgenation.

Besides the diphenols of Formula (Ia) and if applicable other diphenols (Ib), the mono- and/or bis-chloro-carbonic acid ester can also be used, these being added dissolved in organic solvents. The amount of chain terminators and of branching agents then depends on the molar amount of diphenolate radicals according to Formula (Ia) and if applicable Formula (Ib); when chlorocarbonic acid esters are also used, the amount of phosgene can correspondingly be reduced in a known manner.

Suitable organic solvents for the chain terminators and, if applicable, for the branching agents and the chlorocarbonic acid esters are for instance methylene chloride, chlorobenzene, in particular mixtures of methylene chloride and chlorobenzene. If applicable, the employed chain terminators and branching agents may be dissolved in the same solvent.

As an organic phase for the interfacial condensation serve for instance methylene chloride, chlorobenzene and mixtures of methylene chloride and chlorobenzene.

As an aqueous alkaline phase serves for instance NaOH solution. The production of the polycarbonate derivatives according to the phase boundary method can be catalyzed in a conventional manner by catalysts such as tertiary amines, in particular tertiary aliphatic amines such as tributylamine or triethylamine; the catalysts can be used in amounts of 0.05 to 10 mole %, referred to the moles of employed diphenols. The catalysts can be added before beginning the phosgenation or during or also after the phosgenation.

The polycarbonate derivatives can be produced according to the known method in an homogeneous phase, the so-called "pyridine method", and according to the known melt transesterification process using for instance diphenyl carbonate in place of phosgene.

The polycarbonate derivatives may be linear or branched, they are homopolycarbonates or copolycarbonates based on the diphenols of Formula (Ia).

By suitable combination with other diphenols, in particular with those of Formula (Ib), the polycarbonate properties may favorably be varied. In such copolycarbonates, the diphenols of Formula (Ia) are contained in polycarbonate derivatives in amounts from 100 mole % to 2 mole %, preferably in amounts from 100 mole % to 10 mole %, and in particular in amounts from 100 mole % to 30 mole %, and most particularly from 0 mole % to 50 mole %, referred to the total amount of 100 mole % of diphenol units.

A particularly advantageous embodiment of the invention is characterized in that the polycarbonate derivative is a copolymer comprising, in particular consisting of monomer units M1 based on bisphenol A and monomer units M2 based on the geminally disubstituted dihydroxy-diphenyl cycloalkane, preferably of the 4,4'-(3,3,5-trimethyl cyclohexane-1,1-diyl)diphenols, the molar ratio M2/M1 preferably being greater than 0.5, in particular greater than 0.8, for instance greater than 1.0.

Most particularly preferred is a liquid preparation containing: A) 1 to 40 wt % of a polycarbonate derivative used according to the invention, and B) 50 to 99 wt % of an organic solvent or solvent mixture.

The employed organic solvents are preferably halogen-free solvents. They may include in particular aliphatic, cycloaliphatic, aromatic hydrocarbons, such as mesitylene, 1,2,4-trimethylbenzene, cumene and solvent naphtha, toluol, xylol; ester, such as methyl acetate, ethyl acetate, butyl acetate, methoxypropyl acetate, ethyl-3-ethoxy propionate, butylglycol acetate. Preferred are mesitylene, 1,2,4-trimethylbenzene, cumene and solvent naphtha, toluol, xylol, acetic acid methyl ester, acetic acid ethyl ester, methoxypropyl acetate, butylglycol acetate ethyl-3-ethoxy propionate. Most particularly preferred are: mesitylene (1,3,5-trimethylbenzene), 1,2,4-trimethylbenzene, cumene (2-phenyl propane), solvent naphtha, ethyl-3-ethoxy propionate, methoxypropyl acetate and butylglycol acetate.

A suitable solvent mixture comprises for instance L1) 0 to 10 wt %, preferably 1 to 5 wt %, in particular 2 to 3 wt %, of mesitylene, L2) 10 to 50 wt %, preferably 20 to 50 wt %, in particular 20 to 40 wt %, of 1-methoxy-2-propanol acetate, L3) 0 to 20 wt %, preferably 1 to 20 wt %, in particular 7 to 15 wt %, of 1,2,4-trimethylbenzene, L4) 10 to 50 wt %, preferably 20 to 50 wt %, in particular 20 to 40 wt %, of ethyl-3-ethoxy propionate, L5) 0 to 10 wt %, preferably 0.01 to 2 wt %, in particular 0.05 to 0.5 wt %, of cumene, and L6) 0 to 80 wt %, preferably 1 to 40 wt %, in particular 15 to 25 wt %, of solvent naphtha, the sum of the components L1 to L6 always being 100 wt %. In place of L2 and/or L4 or additionally thereto, the solvent mixture may also contain L7) with 10 to 50 wt %, preferably 20 to 50 wt %, in particular 20 to 40 wt %, of butyl glycol acetate, the sum of the employed components L1 to L7 always being 100 wt %.

As organic solvents for the preparation of a binding agent solution suitable for coating a layer or the textile are considered, besides the solvents described above in the context of the binding agent and the production thereof, all conventional solvents and solvent mixtures in the field of for instance the printing technology, in particular the ink-jet printing technology. However, aqueous dispersions containing less than 10 wt % organic solvents can also be used. Then, the binding agent with its components according to the invention comprises dispersed film-forming particles. Depending on the field of application, the preparation may be a solution, dispersion, emulsion, or paste. Adjusting and selecting a suitable viscosity under consideration of the coating technology to be used is easy for the person skilled in the art. Coloring agents and/or dispersing additives, for instance commercially available from the companies Evonik or Byk, may be added.

If the above polycarbonates or polycarbonate derivatives are employed for layers and binding agents, then during production by lamination a particularly stable PC block composite protected against delamination is obtained.

In a further advantageous embodiment of the invention, the textile is coated and/or wet through on one or both sides at least in the region between the layers or outside the layers at least partially with an organic binding agent, wherein by means of the partial coating and/or wetting-through on one or both sides a pattern is formed, preferably by application of the binding agent as a printing layer on the textile and/or on an inner side of a layer or both inner sides of both layers. Thus ultimately is obtained, for instance with transparent or opaque layers and textile a kind of "watermark", i.e. a pattern that is visible when viewed by transmitted light, which insofar serves as a security feature. In this embodiment, there may also be provided luminescent substances and/or particles in the binding agent, which emit visible light, for instance when excited by UV radiation. All conventional luminescent substances or particles are contemplated. When then the data sheet is irradiated with UV radiation, the "watermark" will become visible. Insofar, then the pattern per se needs not be detectable when illuminating with visible light.

In principle, the binding agent may additionally contain one or a plurality of substances or materials from the group consisting of color pigments, effect pigments, optically variable pigments, and luminescent pigments.

In another embodiment of the invention, in or on the textile or between textile and a layer, embedded in the binding agent, at least one electronic circuit with an antenna connected thereto is disposed.

The textile may be a fabric, knitted fabric, a woven fabric, a braid, a stitch-bonded fabric, a non-woven material, a felt, areal fiber bundles, a fiber network, or an areal fiber arrangement. Materials may include, for instance, polyester, polyamide, cotton, or glass fibers.

Preferably, the textile is formed from transparent or opaque fibers. In this variant, the fibers of the textile may substantially be parallel to each other and act as strip lenses when viewing the data sheet, whereby optical effects with regard to a printed image disposed in or on a layer can be produced. Such optical effects include tilt effects at different angles, 3-D effects, Moiré patterns or magnifications, or motion effects.

The invention further comprises a method for preparing a data sheet according to the invention, wherein two layers of an organic polymeric material and a textile are provided, wherein on at least partial sections of one side of a layer or of both layers and/or on partial sections of one side or of both sides of the textile a coating of a liquid uncured binding agent preparation is applied, in particular imprinted, wherein the layers and the textile are stacked on each other and are disposed with the coated sides facing each other with the proviso that part of the textile projects as a flap outside the two layers, wherein then the layers and the textile are laminated to each other, and wherein the binding agent is cured or crosslinked. The flap may be provided with the binding agent or may not include the binding agent. The textile may be disposed in a partial section only between the layers, or in the total region between the layers.

As printing techniques for the application of the binding agent or of a preparation containing the binding agent, all techniques being conventional in the field of security and/or valuable documents can be used, such as screen printing, flexo printing, offset printing, letterpress printing, gravure printing, intaglio printing, thermosublimation, or inkjet printing. Alternatively, of course, spreading, use of squeegees or rollers, stamping, casting, such as film casting, painting, dipping, rolling or grid application processes, spin coating, calendering, etc. are also possible.

Finally, the invention relates to a security and/or valuable document including a data sheet according to the invention, wherein the data sheet is included by means of the flap in a binding back, in particular is sewn or glued.

BRIEF DESCRIPTION OF THE DRAWINGS

In the following, the invention is explained in more detail with reference to not limiting embodiments. There are:

FIG. 1 shows a data sheet according to the invention with a "watermark",

FIG. 2 shows a data sheet according to the invention with a polymer-containing flap, FIG. 3 shows a data sheet according to the invention with an electronic circuit and antenna, FIG. 4 shows a data sheet according to the invention with a textile in a partial section only, FIG. 5 shows a data sheet according to the invention with transparent textile fibers configured as strip lenses.

EXAMPLES

Example 1: Production of Usable Polycarbonate Derivatives

Example 1.1: Production of a First Polycarbonate Derivative 183.3 g (0.80 mole) of bisphenol A (2,2-bis-(4-hydroxyphenyl)-propane, 61.1 g (0.20 mole) of 1,1-bis-(4-hydroxyphenyl)-3,3,5-trimethyl cyclohexane, 336.6 g (6 mole) of KOH, and 2,700 g of water are dissolved in an inert gas atmosphere under stirring. Then, a solution of 1.88 g of phenol in 2,500 ml of methylene chloride is added. Into the well stirred solution are given at pH 13 to 14 and 21 to 25° C. 198 g (2 moles) of phosgene. Then, 1 ml of ethyl piperidine is added and stirred for another 45 min. The bisphenolate-free aqueous phase is separated, the organic phase is washed after acidifying with phosphoric acid with water to neutral and separated from solvent.

The polycarbonate derivative showed a relative solution viscosity of 1.255.

Example 1.2: Production of a Second Polycarbonate Derivative

As in Example 1.1, a mixture of 127.1 g (0.56 mole) of bisphenol A and 137.7 g (0.44 mole) of 1,1-bis-(4-hydroxyphenyl)-3,3,5-trimethyl cyclohexane was reacted to polycarbonate.

The polycarbonate derivative showed a relative solution viscosity of 1.263.

Example 1.3: Production of a Third Polycarbonate Derivative

As in Example 1, a mixture of 149.0 g (0.65 mole) of bisphenol A and 107.9 g (0.35 mole) of 1,1-bis-(4-hydroxyphenyl)-3,3,5-trimethyl cyclohexane was reacted to polycarbonate.

The polycarbonate derivative showed a relative solution viscosity of 1.263.

Example 2.1: Production of a First Liquid Preparation Used According to the Invention As a liquid preparation to be applied by a printing technique, the following solution is prepared: 17.5 parts by weight of the polycarbonate of Example 1.3, 82.5 parts by weight of the following solvent mixture consisting of:

| | |
|---|---|
| Mesitylene | 2.4 |
| 1-Methoxy-2-propanol acetate | 34.95 |
| 1,2,4-Trimethylbenzene | 10.75 |
| Ethyl-3-ethoxy propionate | 33.35 |
| Cumene | 0.105 |
| Solvent naphtha | 18.45 |

A colorless, highly viscous solution with a solution viscosity of 800 mPas at 20° C. was obtained.

To 92 wt % of this solution are added 8 wt % of a commercial solution of a luminescent substance (fluorescence in the visible range upon UV excitation) in toluol (1.5 wt % in toluol). The mixture is homogenized and is thus ready to use.

Alternatively to the above solution of the polymers, a corresponding amount of the solution APEC PUD 6581-9 (Bayer Material Science) can also be employed.

Example 2.2: Production of a Second Liquid Preparation Used According to the Invention The preparation is prepared analogously to Example 2.1, except that 8 wt % of CD740 of the company Honeywell are employed as the luminescent substance.

Example 2.3: Production of a Third Liquid Preparation Used According to the Invention The preparation is prepared analogously to Example 2.1, except that 8 wt % of CD702 of the company Honeywell are employed as the luminescent substance.

Example 2.4: Production of a Fourth Liquid Preparation Used According to the Invention The preparation is prepared analogously to Example 2.1, however the luminescent substance is omitted.

Example 3: Production of Different Embodiments of a Data Sheet According to the Invention

DETAILED DESCRIPTION

In FIG. 1, same as in the other Figures, a data sheet 1 according to the invention 1 is shown, or rather the components thereof before lamination are shown. Firstly, two layers 2, 3 of an organic polymeric material can be seen in the Figures, preferably of transparent PC. The layers may be formed of several films. Furthermore, on or in a layer 2, 3 or both layers 2, 3, printing layers 16 and/or security features may be provided, which are not shown for the sake of simplicity, except in FIG. 5. Insofar, a layer may also be transparent in partial sections only. In principle, the layers may however also be in total intransparent. Further can be seen a textile 5 formed of fibers 9, for instance glass fibers or polyamide fibers. Finally, there is a binding agent 6, which is applied on the textile 5 and may wet it through (though not necessarily). The binding agent 6 can be applied by means of a printing technology on the textile 5, by one-sided or two-sided printing, or by any other conventional coating technology. Finally can be seen that outside the layers 2, 3, the textile 5 is projecting, whereby a flap 4 is formed. The completed data sheet 1 is achieved by lamination of the shown components in the shown arrangement or stacking thereof. The binding agent 6 may have been dried before lamination, this is however not necessarily required.

In the embodiment of FIG. 1, the binding agent 6 has regions of different printing density, according to a pattern on which the printing process is based. If the shown composite of components (with dried binding agent 6) is laminated by means of a lamination device 10, the binding agent 6 and both layers 2, 3 are bonded together, and then the regions of different printing densities of the binding agent 6 in the completed data sheet 1 are visible by transmitted light as a "watermark" pattern. In this embodiment, the lamination device 10 may be formed of two planar lamination metal sheets 11, 12. These are heated and cooled under pressure in a conventional manner in a heating/cooling press combination.

Whereas, in the embodiment of FIG. 1, the flap 4 is not provided with a binding agent, it is provided or imprinted with the binding agent 6 in the embodiment of FIG. 2. For the lamination, it is then recommended that the lamination metal sheets include opposed steps 13, 14, which cause a height compensation in the region of the flap 4. In this embodiment, it is advantageous that "fringing" in the region of the flap can be prevented.

In the embodiment of FIG. 3, an electronic circuit 7, for instance a transponder, is embedded on the textile in the binding agent 6, and an antenna 8 electrically connected therewith is provided. These components are integrated in the data sheet 1 during lamination. Except for that, this embodiment corresponds to that of FIG. 1.

Whereas in the previously described embodiments, the textile 5 extended over the whole data sheet 1, FIG. 4 shows an embodiment, in which the textile 5 is disposed in a partial section only between the layers 2, 3. In the textile-free regions between the layers 2, 3, then a polymeric film 15, preferably of PC, and having the thickness of the textile 5 may be fitted, though not necessarily required. Then, in the completed laminated data sheet 1, a uniform thickness is ensured.

Finally, FIG. 5 shows an embodiment with a textile 5, wherein the fibers 9 are transparent and parallel to each other forming a strip lens. The printing image 16 disposed on the layer 2 and under the textile, is then subject to optical effects for a person viewing it.

The invention claimed is:

1. A data sheet (1) for integration in a book-format security or valuable document,
    wherein the data sheet (1) is comprised of at least two stacked layers (2, 3) of an organic polymeric material,
    wherein at least in a partial section between the layers (2, 3) and outside the layers (2, 3), a textile (5) forming a flap (4) is disposed, and
    wherein the textile (5) is coated or wet on one or both sides at least in the region between the layers (2, 3) and at least partially with an organic binding agent (6) and is bonded with the two layers (2, 3) by way of the binding agent (6);
    wherein the textile (5) is formed from transparent or opaque fibers (9),
    wherein the fibers (9) of the textile (5) are substantially straight-lined and parallel to each other and act as strip lenses when viewing the data sheet (1), whereby optical effects with regard to a printed image disposed in or on the layer (2, 3) is produced.

2. The data sheet (1) according to claim 1, wherein the organic polymeric material is selected from the group consisting of PC (polycarbonate,), PET (polyethylene terephthalate), PMMA (poly(methyl methacrylates)), TPU (thermoplastic polyurethane elastomers), PE (polyethylene), PP (polypropylene), PI (polyimide or poly-trans-isoprene), PVC (polyvinyl chloride), polystyrene, polyacrylates and methacrylates, vinyl esters, ABS and copolymers consisting of polymers, cycloolefin copolymers, polysulfones, polyesters, PET, PEN, polycarbonate/polyester blends, e.g., PC/CoPET, polycarbonate/polycyclohexyl methanol cyclohexane dicarboxylate.

3. The data sheet (1) according to claim 1, wherein the organic binding agent (6) is a polycarbonate derivative.

4. The data sheet (1) according to claim 1, wherein the textile (5) in the region between the layers (2, 3) or outside the layers (2, 3) is partially coated or wet on one or both sides of the layers (2, 3) with the organic binding agent (6), wherein by way of the partial coating or wetting on one or both sides a pattern is formed.

5. The data sheet (1) according to claim 1, wherein the binding agent (6) additionally includes one or a plurality of substances or materials from the group consisting of color pigments, effect pigments, optically variable pigments, and luminescent substances or pigments.

6. The data sheet (1) according to claim 1, wherein in or on the textile (5) at least one electronic circuit (7) with an antenna (8) connected thereto is disposed.

7. The data sheet (1) according to claim 1, wherein at least one layer (2, 3), are transparent or opaque.

8. A method for preparing a data sheet (1) according to claim 1 comprising the steps of:
    providing two layers (2, 3) of an organic polymeric material and a textile (5) formed from transparent or opaque fibers,
    applying on at least partial sections of one side of a layer (2, 3) or of both layers (2, 3) or on partial sections of one side or of both sides of the textile (5) a coating of a liquid uncured binding agent (6),
    stacking the layers (2, 3) and the textile (5) on each other and disposing with the coated sides facing each other with the proviso that part of the textile (5) projects as a flap (4) outside the two layers (2, 3), and wherein the textile is formed from transparent or opaque fibers,
    laminating the layers (2, 3) and the textile (5) to each other, and
    curing or crosslinking the binding agent (6).

9. The method according to claim 8, wherein the flap (4) is provided with the binding agent (6) or does not include the binding agent (6).

* * * * *